US012783332B2

(12) United States Patent
Jin et al.

(10) Patent No.: US 12,783,332 B2
(45) Date of Patent: Nov. 3, 2026

(54) LAYERED ARCHITECTURE FOR MANAGING HEALTH OF AN ELECTRONIC SYSTEM AND METHODS FOR LAYERED HEALTH MANAGEMENT

(71) Applicant: NXP B.V., Eindhoven (NL)

(72) Inventors: Xiankun Jin, Austin, TX (US); Andres Barrilado Gonzalez, Toulouse (FR); Mathieu Blazy-Winning, Pibrac (FR)

(73) Assignee: NXP B.V., Eindhoven (NL)

( * ) Notice: Subject to any disclaimer, the term of this patent is extended or adjusted under 35 U.S.C. 154(b) by 214 days.

(21) Appl. No.: 18/348,403

(22) Filed: Jul. 7, 2023

(65) Prior Publication Data

US 2024/0020186 A1 Jan. 18, 2024

(30) Foreign Application Priority Data

Jul. 15, 2022 (EP) .................................... 22306065

(51) Int. Cl.

| | |
|---|---|
| ***G06F 11/00*** | (2006.01) |
| ***G06F 11/30*** | (2006.01) |
| ***G06F 11/32*** | (2006.01) |
| *G06F 11/34* | (2006.01) |

(52) U.S. Cl.

CPC ........ *G06F 11/008* (2013.01); *G06F 11/3065* (2013.01); *G06F 11/321* (2013.01); *G06F 11/324* (2013.01); *G06F 11/3409* (2013.01)

(58) Field of Classification Search

CPC .. G06F 11/008; G06F 11/3065; G06F 11/321; G06F 11/324; G06F 11/3409; G06F 11/0739

See application file for complete search history.

(56) References Cited

U.S. PATENT DOCUMENTS

| | | | | |
|---|---|---|---|---|
| 8,914,149 | B2 | 12/2014 | Safa-Bakhsh et al. | |
| 2003/0212928 | A1* | 11/2003 | Srivastava .......... | G06F 11/3055 714/47.3 |
| 2006/0048017 | A1 | 3/2006 | Anerousis et al. | |
| 2012/0281706 | A1 | 11/2012 | Agrawal et al. | |
| 2017/0041197 | A1* | 2/2017 | Shen .................. | G06F 11/3616 |
| 2017/0317901 | A1* | 11/2017 | Agrawal ............. | H04L 41/0893 |
| 2019/0235941 | A1* | 8/2019 | Bath ..................... | G06F 11/079 |
| 2019/0303777 | A1* | 10/2019 | Desai ...................... | G06F 9/542 |

(Continued)

FOREIGN PATENT DOCUMENTS

WO 2017/052872 A1 3/2017

OTHER PUBLICATIONS

Hierarchical control system—Wikipedia—Apr. 2022 (Year: 2022).*

(Continued)

*Primary Examiner* — Marc Duncan
*Assistant Examiner* — Michael Xu

(57) ABSTRACT

A layered architecture for managing health of the electronic system comprises a plurality of health subsystems. Health subsystems receive health information from health monitors coupled to respective components of the electronic system and provide the health information to another health subsystem. Based on the received health information, the other health subsystem uses predictive data analytics to determine a health condition of the electronic system and update a health policy based on the predictive data analytics to improve prediction of the health condition of the electronic system.

20 Claims, 9 Drawing Sheets

(56) References Cited

U.S. PATENT DOCUMENTS

| | | | | |
|---|---|---|---|---|
| 2020/0162503 | A1* | 5/2020 | Shurtleff | G06F 11/00 |
| 2021/0034495 | A1* | 2/2021 | Venkatraman | G06F 11/3024 |
| 2021/0166548 | A1* | 6/2021 | Ellam | G08B 21/182 |
| 2022/0094590 | A1* | 3/2022 | Lal | H04L 41/0668 |
| 2022/0357821 | A1* | 11/2022 | Roberts | G06F 11/3495 |
| 2023/0109219 | A1* | 4/2023 | Fleiner | G06F 11/0784 714/42 |
| 2023/0112725 | A1* | 4/2023 | Boyapalle | G06F 11/076 710/10 |
| 2023/0135013 | A1* | 5/2023 | Wang | G06F 9/4881 718/102 |
| 2023/0171293 | A1* | 6/2023 | Galtie | H04L 63/205 726/1 |
| 2023/0297453 | A1* | 9/2023 | Viclizki | G06N 3/045 714/47.2 |
| 2023/0368069 | A1* | 11/2023 | Xu | G06N 3/045 |
| 2023/0384940 | A1* | 11/2023 | Chandrashekaraiah | G06F 3/0616 |
| 2024/0241778 | A1* | 7/2024 | Zhou | G06F 11/079 |

OTHER PUBLICATIONS

Seimens, "Manage the effects of chip complexity with Embedded Analytics," May 10, 2021, downloaded from https://blogs.sw.siemens.com/tessent/2021/05/10/manage-the-effects-of-chip-complexity-with-embedded-analytics/ Jun. 2, 2023, 3 pages.

Kashyap, R. "Silicon lifecycle management (SLM) with in-chip monitoring," 2021 IEEE International Reliability Physics Symposium (IRPS), 2021, pp. 1-4.

* cited by examiner

304

LAYERED ARCHITECTURE FOR MANAGING HEALTH OF AN ELECTRONIC SYSTEM AND METHODS FOR LAYERED HEALTH MANAGEMENT

CROSS-REFERENCE TO RELATED APPLICATIONS

This application claims the priority under 35 U.S.C. § 119 of European Patent application no. 22306065.8, filed on 15 Jul. 2022, the contents of which are incorporated by reference herein.

FIELD OF USE

This disclosure generally relates to an electronic system, and more particularly to a layered architecture for managing health of the electronic system and methods for layered health management of the electronic system.

BACKGROUND

Electronic systems are becoming more complex. With this added complexity comes increased chances that a component of an electronic system will fail. The components include active components, passive components, sensors, actuators, and integrated circuits, among other types of components of the electronic system. Ideally, to avoid such failure, degraded operation of the component is detected before actual failure of the component.

Figure 1:
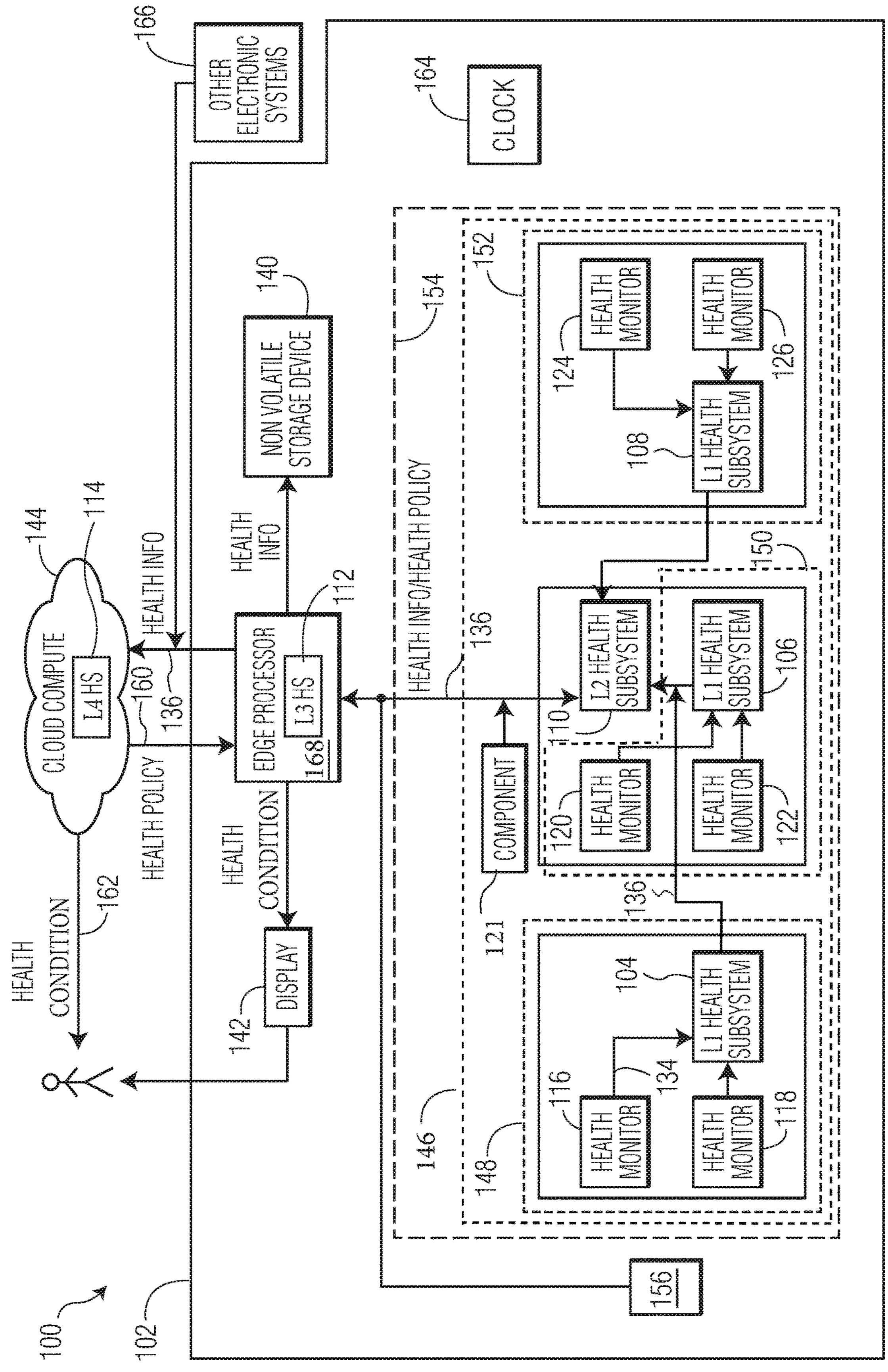
FIG. 1 is a block diagram of a layered architecture for managing health of an example electronic system in accordance with an example embodiment

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows associated with layered health management of an electronic system.

Overview

Embodiments disclosed herein are directed to a layered architecture for managing health of an electronic system. The layered architecture includes monitoring by health monitors components of the electronic system in different layers of the electronic system. A layer of the electronic system includes one or more groups of components where each group is a same circuit type and a higher layer further includes groups of components in a lower layer. The types of components include active components, passive components, integrated circuits, actuators, sensors, power management integrated circuits (PMIC), transmitters, receivers, or circuit boards among other types of components of the electronic system and the circuit type is an system-on-a-chip (SoC) or circuit board in an example. The health monitors monitor health information of the components such as, for example, voltages, currents, temperatures, timing, frequency, or other characteristics of the components.

The electronic system has one or more health subsystems to capture the health information of components in groups of one or more layers. In an example, first layer health subsystems receive the health information of a respective group of components in a first layer of the electronic system, each group in the first layer being a same circuit type. The first layer health subsystems provide the received heath information to a second layer health subsystem which receives second health information which comprises the first health information, where each group in the second layer is a same circuit type. A third layer health subsystem receives third health information which includes the second health information from one or more second layer health subsystems. The third health information is associated with groups of the third layer of the electronic system. A group of the third layer comprises components of a group in the second layer and each group in the third layer is a same circuit type. The third layer health subsystem provides the received health information to a cloud compute. A fourth layer health subsystem of the cloud compute receives the health information of a respective third layer health subsystem of one or more electronic systems of a same type. The fourth layer health subsystem uses the received health information to define a health policy for the type of electronic system based on predictive data analytics. Further, based on the health information from an electronic system, the health policy is used to determine a health condition of the electronic system. The fourth layer health subsystem wirelessly transmits the health condition to a wireless terminal such as a smartphone of a user of the electronic system and the health policy to the third layer health subsystem of the electronic systems. The third layer health subsystem which receives the health policy also uses the health policy to provide the health condition to a display of the electronic system for consumption by the user to indicate whether predictive maintenance of the electronic system is needed.

The capture of the health information at a granularity of the layers of the electronic system allows for efficient capture of health information which might not otherwise be accessible in the electronic system if health information is captured only at a single layer of the electronic system. Well known instructions, protocols, structures, and techniques have not been shown in detail in order not to obfuscate the description.

Example Systems

FIG. 1 is a block diagram 100 of a layered architecture for managing health of an example electronic system 102 in accordance with an embodiment. The electronic system 102 may be in a mobile structure, a stationary structure, a land based structure, an aquatic-based structure, or a space-based structure. In an example, the electronic system 102 may be an aircraft, a submarine, a bus, a personnel carrier, a tank, a train, an automobile, a spacecraft, a space station, a satellite, or a boat. Reliability of the electronic system 102 in the structure is important to operation and use of the structure.

The electronic system 102 may be implemented with various components and a health condition of the various components is monitored. In an example, the health condition may indicate whether a component is failing and should be remedied (e.g., fixed or replaced) before it fails. The components of the electronic system may include one or more of active components, passive components, integrated circuits, actuators, sensors, power management integrated circuits (PMIC), transmitters, receivers, or circuit boards, among other components. The electronic system 102 may also have one or more health subsystems (HS) 104-114 to capture and process health information provided by health monitors (HM) 116-126 associated with the different components. The health subsystem 104-114 may be a processor or a state machine implemented with hardware (e.g., circuits), software, firmware, or a combination thereof and the health information includes, for example, voltages, currents, temperatures, timing, frequencies, or other characteristics of the components received by the health monitors 116-126. A layer of the electronic system 102 includes one or more groups of components where each group in the layer is a same circuit type and a higher layer includes a group which further includes the groups of components in a lower layer. In an example, the electronic system 102 may have one or more first layer (L1) health subsystems 104-108 of a first layer with health monitors 116-126 in groups 148-152, one or more second layer (L2) health subsystems 110 of a second layer comprising group 146 and a third layer (L3) health subsystem 112 of a third layer, the third layer comprising groups 154, 156. The circuit type of a group in a first layer may be an integrated circuit in an example. The circuit type of a group in a second layer may be a system-on-chip (SoC) in an example. The circuit type of a group in a third layer may be a circuit board in an example. Further, the health subsystems 104-114 may be layered such that an output of one health subsystem is provided as an input to another health subsystem. In the example, the health subsystems may be coupled together by communication paths 136 and health subsystems are coupled to health monitors by communication paths 134.

Each first layer health subsystem may receive health information from health monitors in a respective group of the first layer. Each group 148-152 in the first layer may be an integrated circuit (IC) circuit type in an example. To illustrate, the first layer health subsystem 104 receives health information from health monitors 116-118 coupled to integrated circuits (not shown). In one example, the first layer health subsystem 104 may schedule receipt of health information from the health monitors 116-118. For instance, the first layer health subsystem 104 may send a request for health information to a health monitor 116-118 and receive the health information from the health monitor 116-118 in response to the request. In another example, the health monitor 116-118 may transmit health information to the first layer health subsystem 104 in response to an event. The event may be time-based such as when a clock 164 of the electronic system 102 such as a IEEE 1588 timer reaches a predetermined time or when a particular health information such as a current or voltage exceeds a predefined value. In other examples, the event may be a power-on, power-off, or reset of the electronic system 102.

The second layer health subsystem 110 may receive health information of a respective group in the second layer. Each group in the second layer may be a system on chip (SoC) circuit type in an example. For example, the second layer health subsystem 110 may send a request for the health information to the first layer health subsystems and receive the health information from the first layer health subsystems or the first layer health subsystems may transmit the health information to the second layer health subsystem 110 in response to an event. The group 146 in the second layer may each an SoC in an example. In some example, the health information received by the second layer health subsystem may include health information from additional components 121 of the group in the second layer which may have a health monitor (not shown) to provide respective health information.

The third layer health subsystem 112 may be arranged to receive health information of one or more groups in a third layer of the electronic system. The group 154 in the third layer includes one or more groups in the second layer and the received health information includes the health information of each group 154, 156. In an example, each group 154, 156 is a circuit board circuit type which include the SoC. In an example, the third layer health subsystem 112 may be located on an edge processor 168 which controls operation of the electronic system 102 via a local network of the electronic system 102 such as a zone-based network or domain-based network and is in wireless communication with a cloud compute 144. The cloud compute 144 may be a network of servers for processing the health information from the electronic system 102 and health information from other electronic systems 166 of a same type accessible by the edge processor 168 via the Internet in an example. The third layer health subsystem 112 may provide the received health information to a fourth layer (L4) health subsystem 114 of the cloud compute. The fourth layer health subsystem 114 of the cloud compute receives the health information of a group in the fourth layer which comprises the health information of electronic systems 102 or the health information of other electronic systems 166 of a same type. For example, the electronic system 102 and the additional electronic systems 166 may each be a same electrical system such as a vehicle drivetrain electronic system in an automobile.

The fourth layer health subsystem 114 may have a health policy. In an example, the health policy may model operation of the electronic system. The health information is input to the model which outputs a health condition of the electronic device. The health condition may indicate whether or not a component of the electronic system 102 is in a degraded operation or not operating nominally such that a user may remedy the component before it fails.

The health policy may be defined by predictive data analytics. Predictive data analytics in the context of health monitoring is a process of predicting a health condition of the electronic system 102 based on health information of the electronic system 102. Predictive data analytics comprises a learning or training stage where the health information received from the electronic system 102 and the health information received from other electronic systems 166 of a same type as the electronic system 102 to determine relationships between the health information and a known health condition of the electronic system 102 such as whether a component is degrading or not operating nominally. In an example, the health policy may be a model which is a set of rules defined by the relationships for determining a health condition of the electronic system based on the health information. In some examples, machine learning may be used to develop and refine the set of rules of the model during the initial learning and additional learning or training processes based on the health information which is received over time. Machine learning includes developing algorithms to make predictions of the health condition based on the health information. Based on this health policy, a health condition of the electronic system 102 may be determined from the health information when the health condition is not a priori known. In an example, the health information may be provided to the model which applies the set of rules of the model to the health information to determine and output the health condition.

The fourth layer health subsystem 114 may transmit the determined health condition to the user of the electronic system 102 via a wireless connection 162 to a wireless terminal of the user such as a smartphone so that the user may be able to perform predictive maintenance of the electronic system before the electronic system actually fails. Further, the capture of the health information at a granularity of the layers of the electronic system allows for efficient capture of health information which might not otherwise be available if health information is only captured at a single layer of the electronic system 102.

In examples, the fourth layer health subsystem 114 may provide the health policy to the third layer health subsystem 112 via a wireless connection 160. For example, the fourth layer health subsystem 114 may broadcast the health policy to one or more electronic systems. The broadcast may be received by one or more of the health subsystems in communication with the fourth layer health subsystem 114. Based on the health policy, the third layer health subsystem 112 may be further able to determine the health condition of the electronic system 102 based on the health information of the electronic system 102 and the health policy. For example, the health information may be input into the model which outputs the health condition. In an example, the electronic system 102 may have a display screen 142 to provide via a connection an indication of the health condition to the user of the electronic system 102. In the case that the electronic system 102 controls operation of an automobile, the display screen 142 may be a dashboard of the automobile to present the health information to a driver of the automobile. In an example, the health policy may also indicate an action to perform on the electronic system 102 such as power down a component based on the determined health condition.

In an example, the health policy may also indicate what type of health information should be collected from the health monitors or a timing of when the health information is collected. The third layer health subsystem 112 may provide the health policy or a portion thereof to the second layer health subsystem 110 so that the second layer health subsystem 110 may collect appropriate health information. In an example, the health policy may indicate a time when the second layer health subsystem is to schedule receiving certain health information from the first layer health subsystem 104-108 and the health subsystem may collect the health information based on the clock 164 indicating the time to collect the health information.

In some examples, the health information may be stored in a non-volatile storage device 140 such as non-volatile memory for later use in diagnostic of the electronic system 102. The third layer health subsystem 112 may be coupled to the non-volatile storage device 140 to store the health information. In other examples, one or more of the second layer health subsystem 110 and the first layer health subsystem 104-108 may be coupled to respective non-volatile memory (not shown) to store the received health information.

In some examples, the third layer health subsystem 112 may directly receive health information from the first layer health subsystem 104-108 and second layer health subsystem 110 instead of being limited to receiving health information from only the second layer health subsystem 110 directly. Further, third layer health subsystem 112 may receive health information directly from one or more health monitors in a group of the third layer. In other examples, a layer may be partitioned into sublayers for collecting health information at the layer. In other examples, certain layers such as the first layer may not be implemented in less complex electronic systems. In yet other examples, different layers may be combined for health monitoring. For instance, the first layer and second layer for health monitoring may be combined and health monitoring may require at least a respective layer at the circuit board level, the electronic system level, and the cloud compute level to perform the health monitoring. Additionally or alternatively, the second layer and third layer for health monitoring may be combined to perform the health monitoring. Other variations are also possible.

Because the health policy is available to both the health subsystem in the cloud compute 144 and the health subsystem in the electronic system 102, the electronic system 102 may determine the health condition of the electronic system 102 if the health subsystem in the cloud compute 144 is not operational or by the cloud compute 144 if the health subsystem in the electronic system 102 is not operational. In an example, the fourth layer health subsystem 114 of the cloud compute 144 may not be operational to provide the health condition, for example, if the wireless connection 162 is disabled. In an example, the third layer health subsystem 112 of the may not be operational to provide the health condition, for example, if the connection between the third layer health subsystem 112 and the display screen 142 is disabled.

Figure 2:
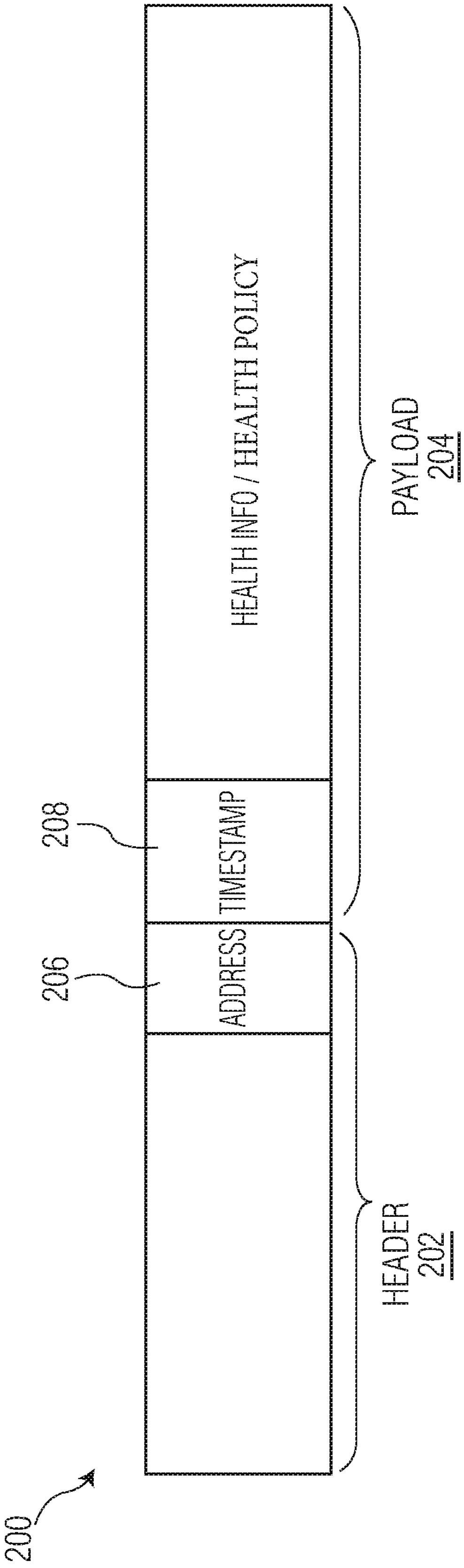
FIG. 2 is an example format of a frame for carrying the health information between health subsystems of the electronic system in accordance with an example embodiment.

FIG. 2 is an example format of a frame 200 for carrying the health information between health subsystems of the electronic system 102 in accordance with an example embodiment. The frame 200 may be communicated over a communication link 136 in an example. The frame 200 may include a plurality of fields including a header 202 and a payload 204. The payload 204 may store the health information received from one or more health monitors. In some examples, the health information in the payload may be compressed or encrypted. The header 202 may include an indication of the health subsystem which is sending the frame 200. In an example, each health subsystem may be uniquely addressable. The indication may be a unique address 206 of the health subsystem so that the health subsystem which receives the frame may be able to determine a source of the frame. The unique address 206 may also indicate a destination address of the health subsystem which is to receive the frame. Further, the health information of the payload 204 may have a respective timestamp 208 that indicates a time that the health information was received from the health monitor, where the clock 164 is used to indicate this time. In other examples, the frame 200 may take other forms and carry other types of information in the payload 204 such as the health policy which is broadcast. In this case, the address 206 may also indicate that the frame 200 is a broadcast frame to be broadcast to a plurality of health subsystems.

Example Methods

Figure 3:
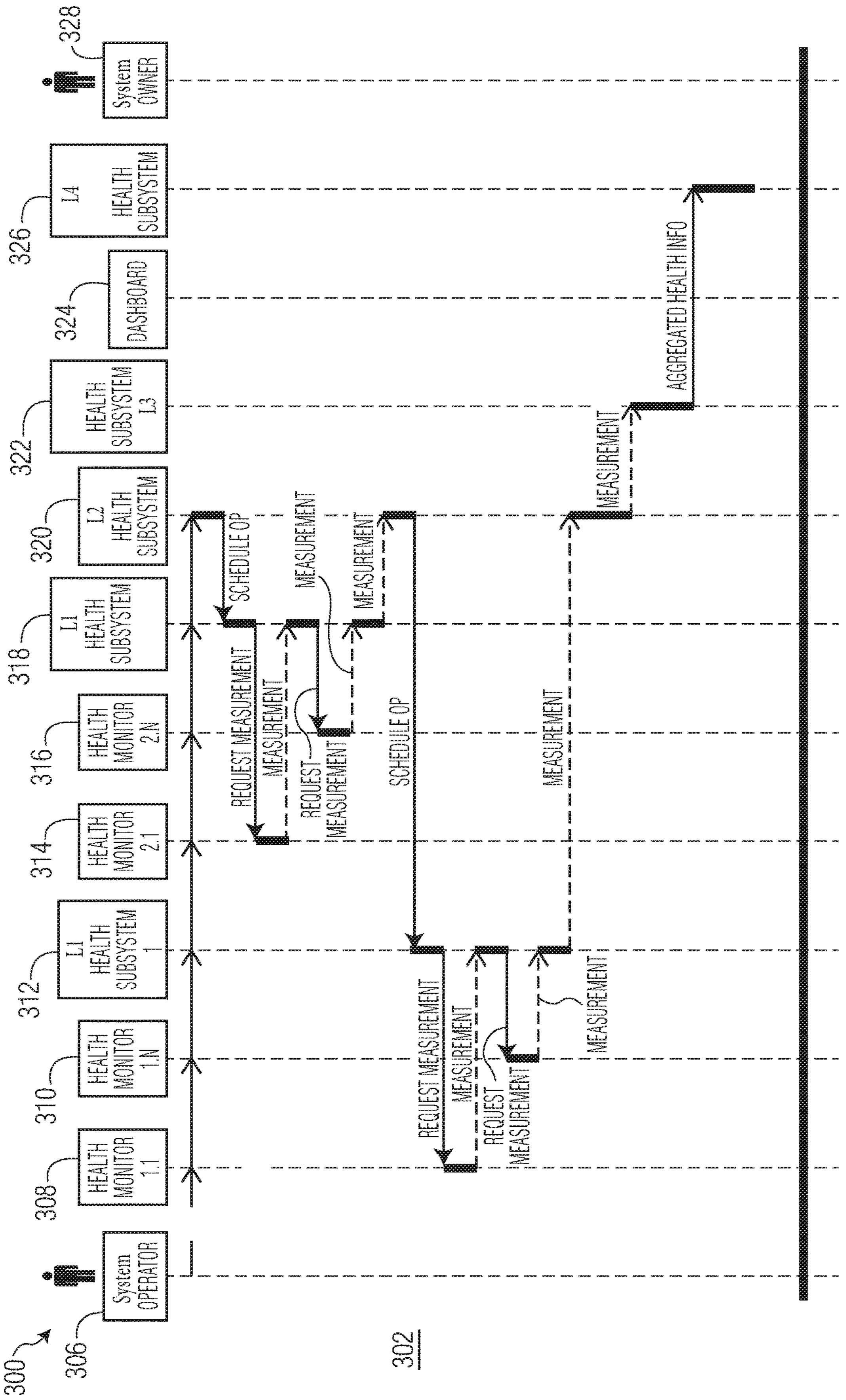
FIG. 3 is an example timing diagram of operation of an example electronic system having a layered architecture for health monitoring in accordance with an example embodiment.

FIG. 3 is an example timing diagram 300 of operation of an example electronic system 102 having a layered architecture for health monitoring in accordance with an example embodiment. The timing diagram shows on axis 302 time (which increases from top to bottom) and on axis 304 example communication among one or more of a system operator 306, health monitors 308-310, a first layer health subsystem 312 associated with the health monitors 308-310, health monitors 314-316, a first layer health subsystem 318 associated with the health monitors 314-316, a second layer health subsystem 320, a third layer health subsystem 322, a dashboard 324, a fourth layer health subsystem 326, and a system owner 328. In the case that the electronic system 102 is in an automobile, the system owner 328 may be a vehicle owner and the system operator 306 may be an automobile manufacturer. In some cases, the system operator 306 and system owner 328 may be a same entity.

In the timing diagram 300, the system operator 306 may provide an indication via a health policy which causes the second layer health subsystem 320 to schedule receiving data from one or more health monitors 314, 316. The second layer health subsystem 320 may send an indication to the first layer health subsystem 318 to schedule receiving health information from the first layer health subsystem 318. In response, the first layer health subsystem 318 may send a request to the health monitor 314, 316 for health information and receive the health information from the health monitor 314, 316. The health information may be measurements associated with components of the electronic system 102. The second layer health subsystem 320 may repeat this process for the first layer health subsystem 312 to receive health information from health monitors 308, 310. In an example, the second layer health subsystem 320 may aggregate the received health information from the first layer health subsystem 312 and the first layer health subsystem 318 and provide the health information to the third layer health subsystem 322 which in turn provides aggregated health information to the fourth layer health subsystem 326 of the cloud compute. The fourth layer health subsystem 326 may use the health information to determine a health condition of the electronic system 102. For example, the fourth layer health subsystem 326 may perform predictive data analytics based on a health policy in the form of a model to predict the health condition of the electronic system 102 based on the received health information.

Figure 4:
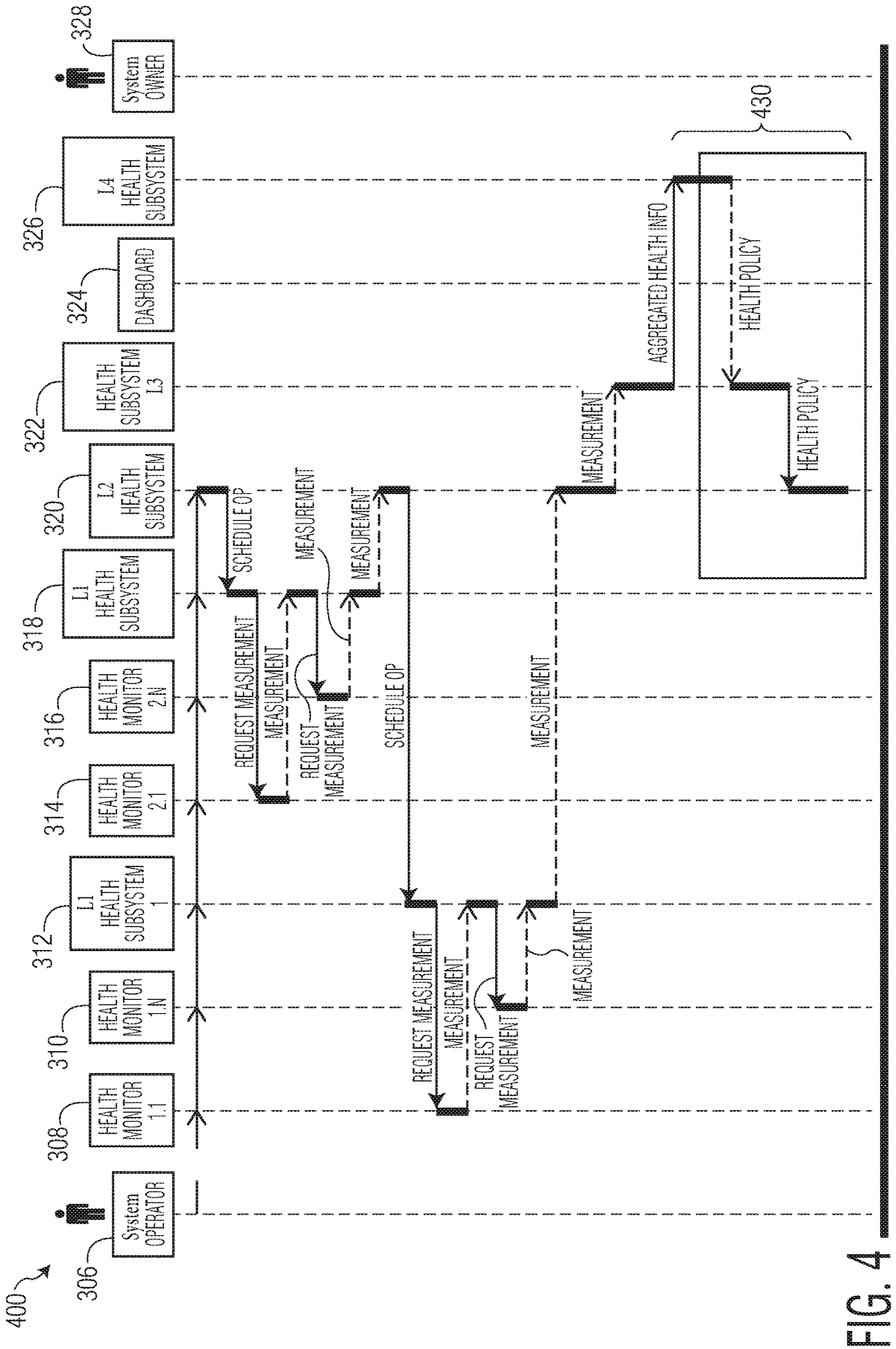
FIG. 4 is another example timing diagram of operation of an example electronic system having a layered architecture for health monitoring in accordance with an example embodiment.

FIG. 4 is another example timing diagram 400 of operation of an example electronic system 102 having a layered architecture for health monitoring in accordance with an example embodiment. The timing diagram 400 includes operations of FIG. 3 and steps 430 where a health policy of the electronic system 102 is provided to the third layer health subsystem 322. The third layer health subsystem 322 may use the health policy to determine the health condition of the electronic system 102. Further, the third layer health subsystem 322 may provide the health policy to the second layer health subsystem 320 over a wireless connection 136 to cause the second layer health subsystem 320 to schedule collection of a certain type of health information from the health monitors or establish a timing of when health information is collected in an example.

Figure 5:
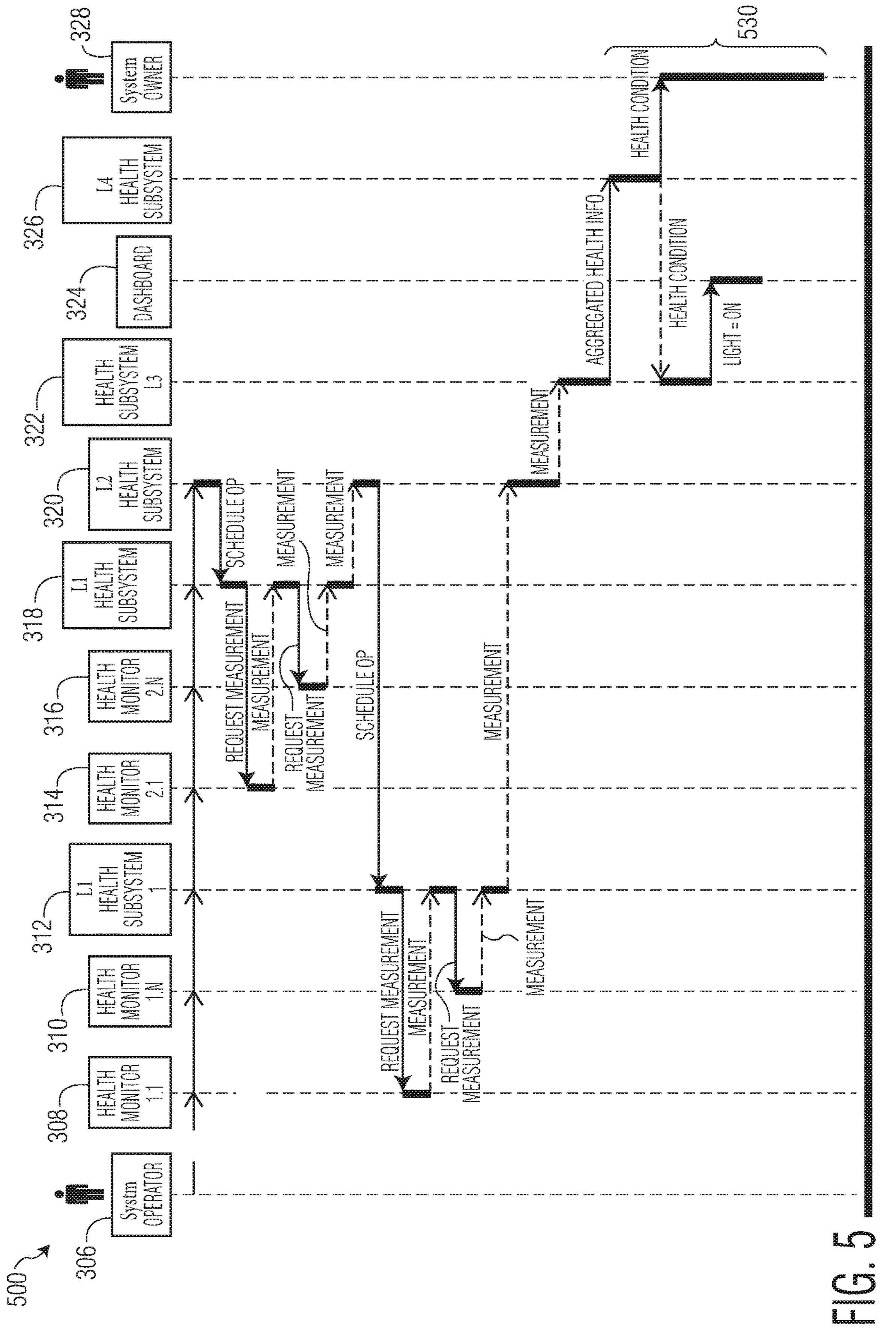
FIG. 5 is yet another example timing diagram of operation of an example electronic system having a layered architecture for health monitoring in accordance with an example embodiment.

FIG. 5 is yet another example timing diagram 500 of operation of an example electronic system 102 having a layered architecture for health monitoring in accordance with an example embodiment. The timing diagram 500 includes operations of FIG. 4 and steps 530. The timing diagram 500 further indicates that the fourth layer health subsystem 326 performs predictive data analytics to determine a health condition of the electronic system 102. The determination may be made, for example, based on inputting the aggregated health information from the electronic system 102 to a model and the model outputting the health condition. This health condition may be provided to the third layer health subsystem 322 which in turn provides the health condition for display on the dashboard 324. In an example, a light indicative of the health condition such as a dashboard warning light may be displayed on the dashboard 324. Further, the fourth layer health subsystem 326 may provide the health condition to system owner 328 via a wireless terminal such as a smart phone via the wireless connection.

Figure 6:
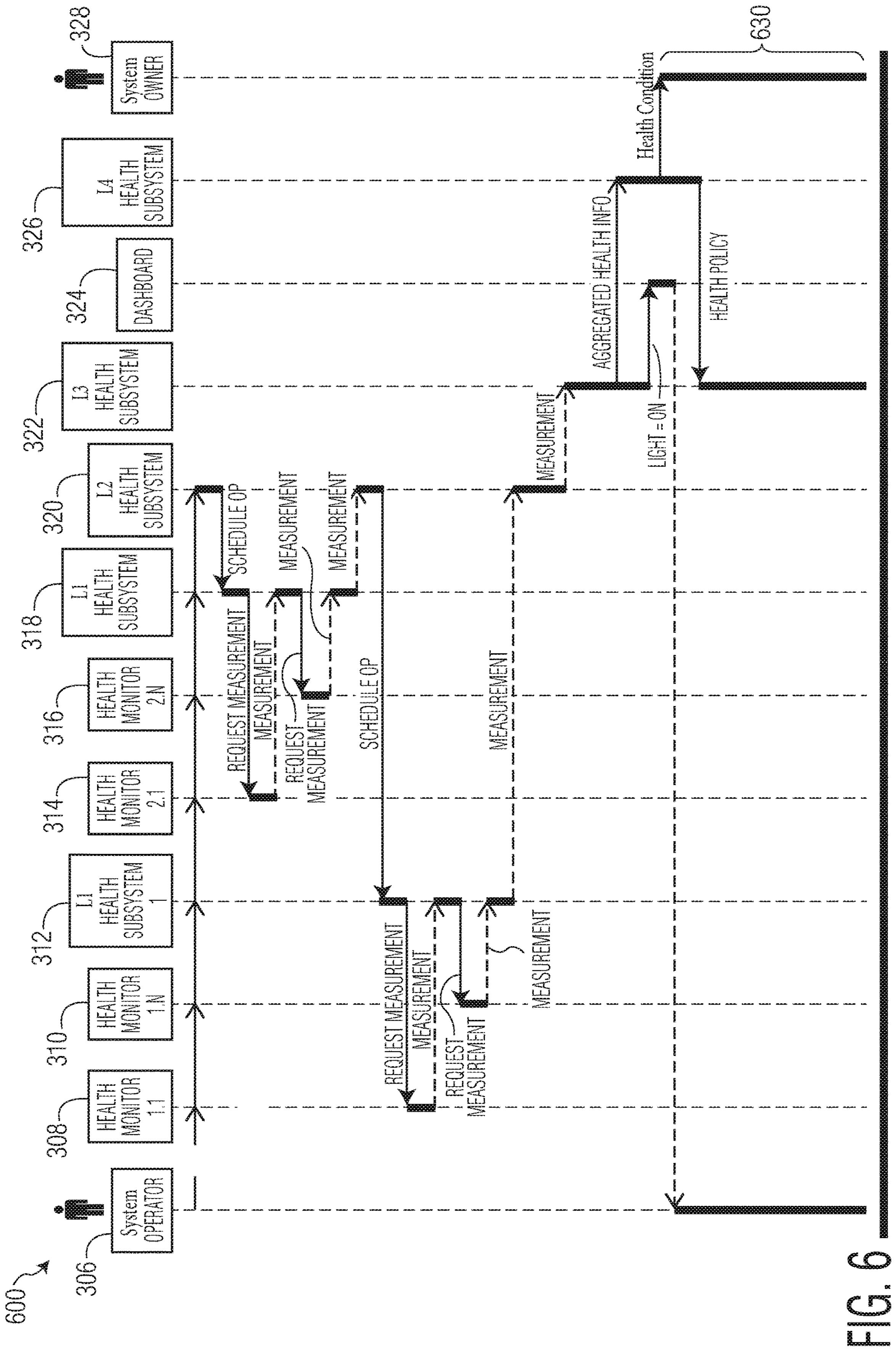
FIG. 6 is another example timing diagram of operation of an example electronic system having a layered architecture for health monitoring in accordance with an example embodiment.

FIG. 6 is another example timing diagram 600 of operation of an example electronic system 102 having a layered architecture for health monitoring in accordance with an example embodiment. The timing diagram 600 includes operations of FIG. 5 and steps 630 of sending an updated health policy of the electronic system 102 from the fourth layer health subsystem 326 to the third layer health subsystem 322 based on the received health information via the wireless connection 160.

In some examples, the third layer health subsystem may alter operation of the electronic system 102 based on the health condition. For example, the operation altered may be to shut down a component that the health condition indicates as failing to prevent further damage to the component or until the component is able to be remedied. As other examples, the operation altered may be to reset the electronic system, gate a clock, or a change an operational mode of the electronic system 102 based on the health condition.

Figure 7:
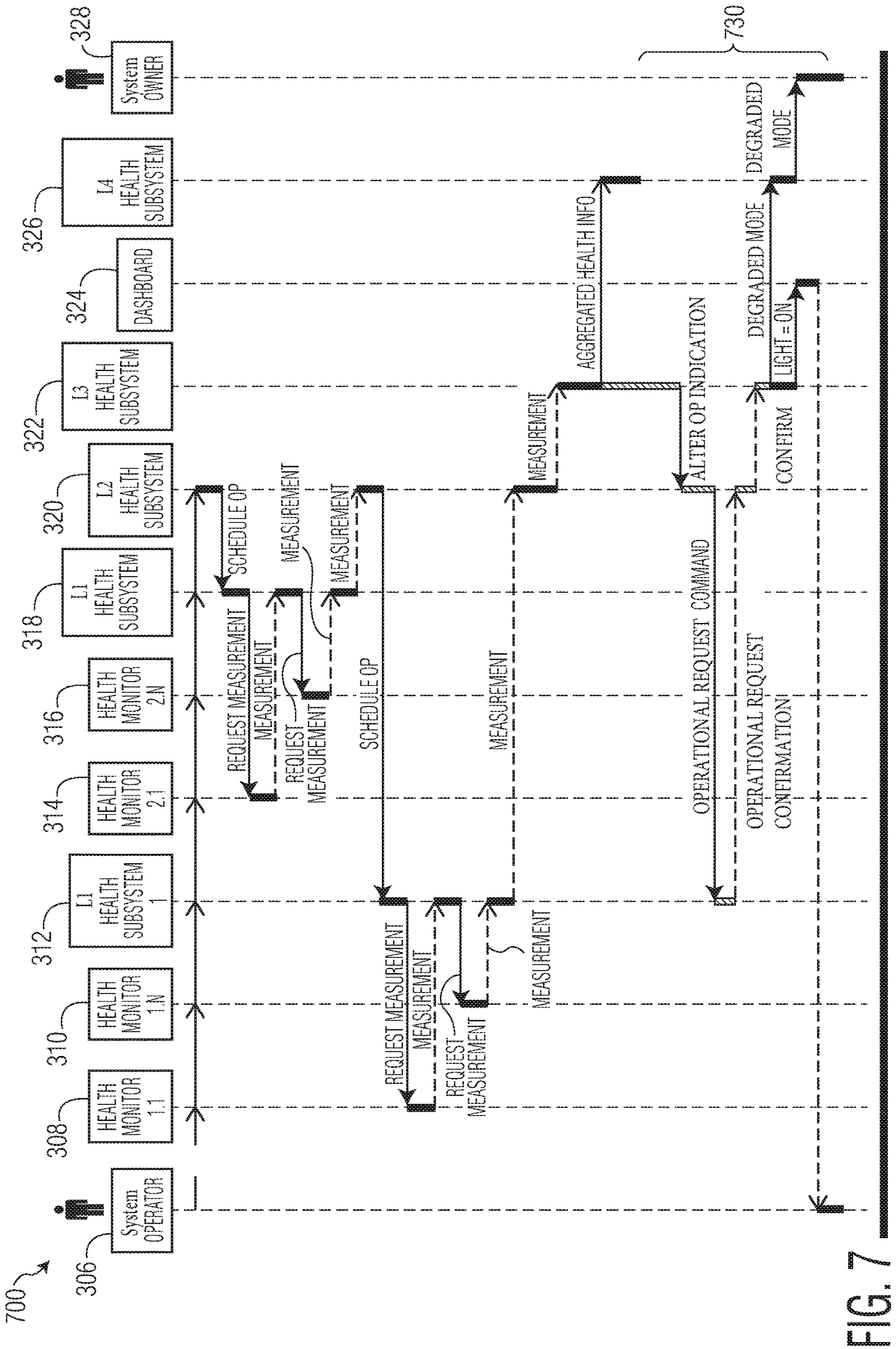
FIG. 7 is an example timing diagram of operation of an example electronic system having a layered architecture for health monitoring with further operation to disable a component of the electronic system based on a health condition in accordance with an example embodiment.

FIG. 7 is an example timing diagram 700 of operation of an example electronic system 102 having a layered architecture for health monitoring with further operation to disable a component based on a health condition in accordance with an example embodiment. The timing diagram 700 includes operations of FIG. 3 and steps 730 where the third layer health subsystem 322 determines a need to alter operation of the electronic system 102 based on a health policy. The third layer health subsystem 322 may send an indication to alter operation of the electronic system 102 to the second layer health subsystem 320. The indication may cause an operational request command to be provided to the first layer health subsystem 312 to alter the operation in an example. The first layer health subsystem 312 may alter the operation followed by an operational request confirmation provided to the second layer health subsystem 320 which in turn provides a confirmation to the third layer health subsystem 322. In an example, the third layer health subsystem 322 may cause an indication of a degraded mode of the electronic system 102 to be presented on the display screen 324 such as a light on the display screen 324 which indicates the altered operation from a normal operation. Further, the third layer health subsystem 322 provide the indication to the fourth layer health subsystem 326 which causes the fourth layer health subsystem 326 to send the indication to a wireless terminal 328 such as a smart phone. The indication of the degraded mode may indicate to the user that the electronic system 102 is operating in the degraded mode and requires predictive maintenance.

Figure 8A:
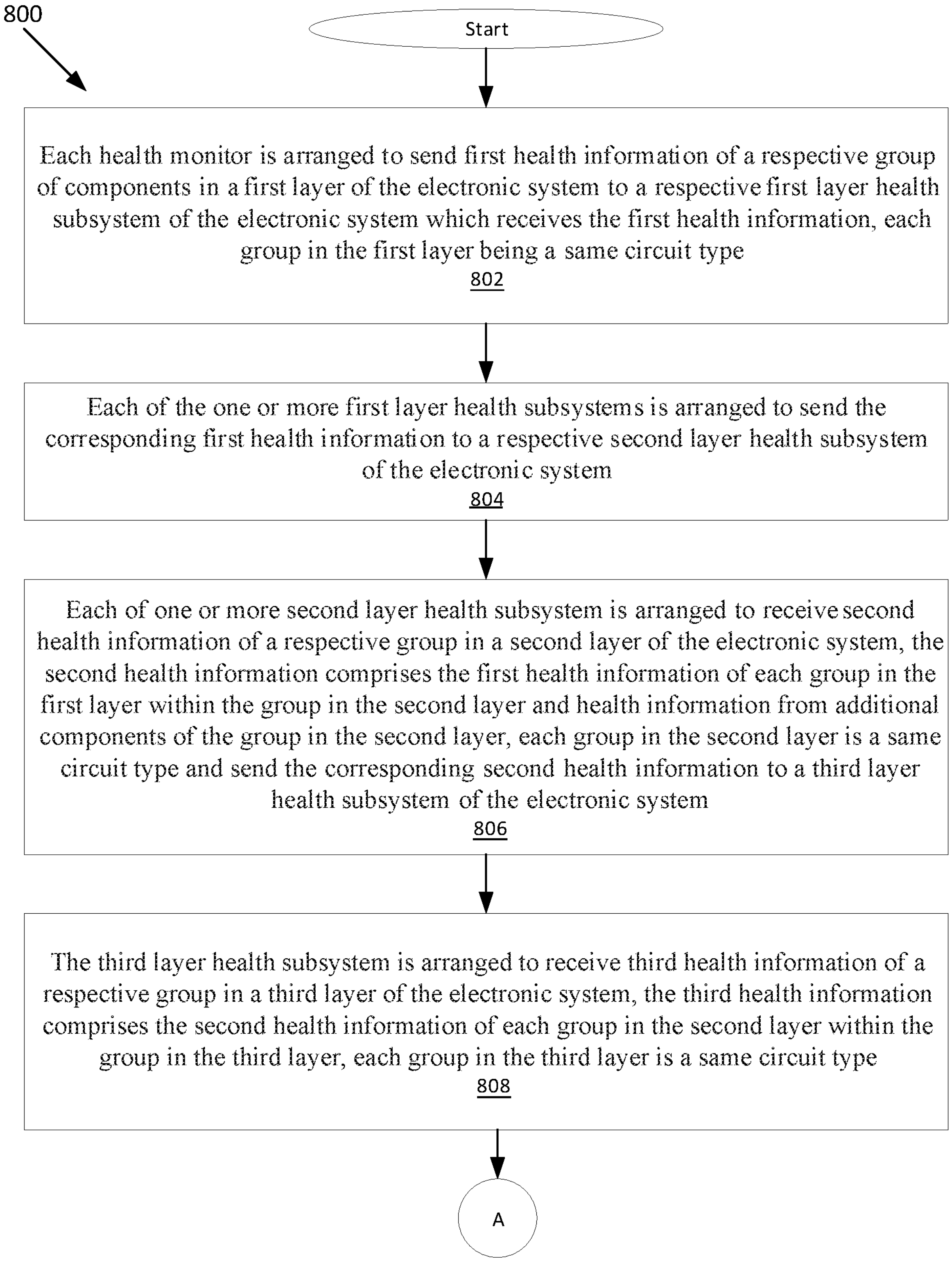
FIGS. 8A & 8B illustrate an example flow chart of functions associated with a layered architecture for health monitoring in accordance with an example embodiment.
Figure 8B:
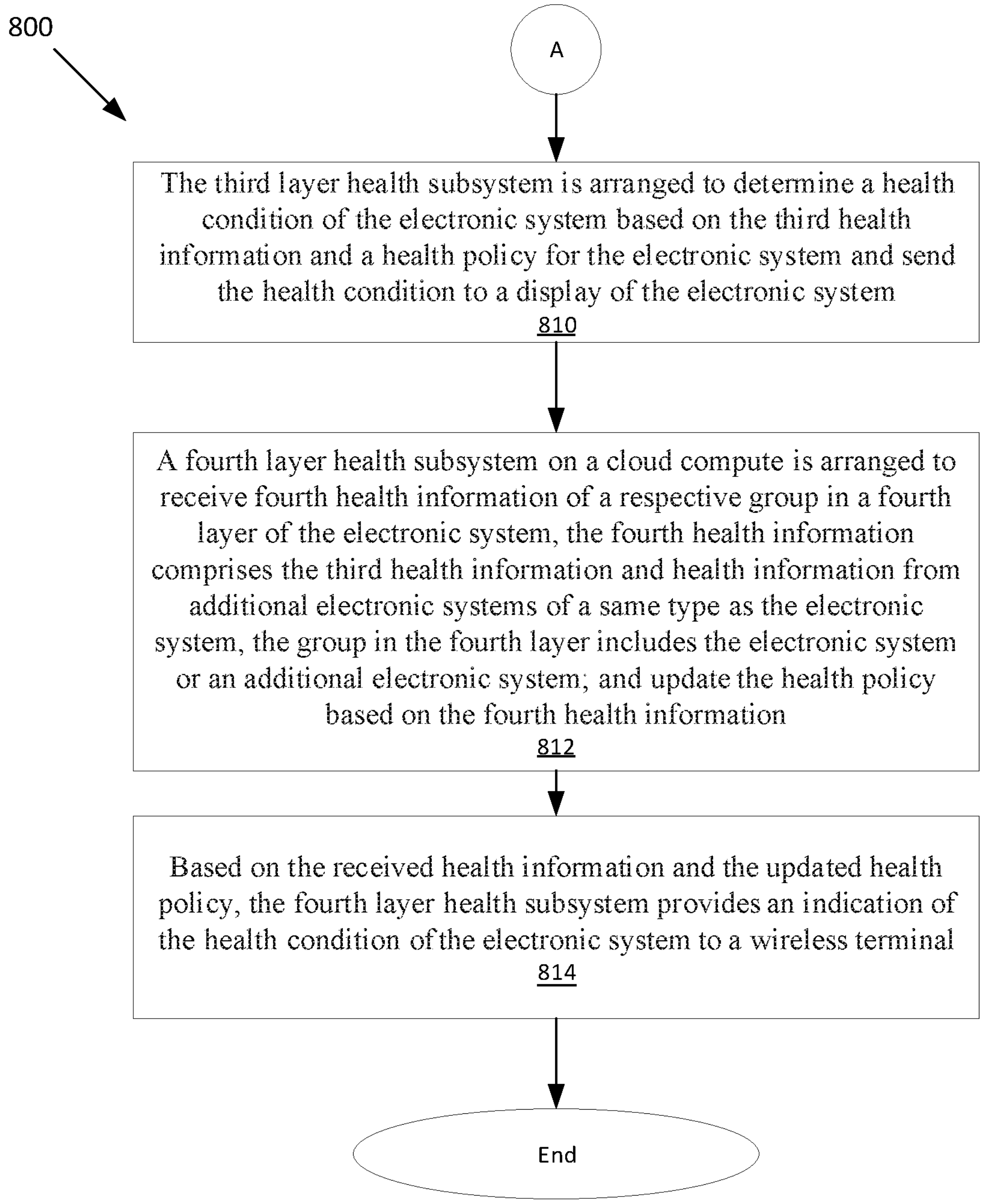

FIGS. 8A & 8B illustrate an example flow chart 800 of functions 802-814 associated with a layered architecture for health monitoring in accordance with an example embodiment. Functions of the flow chart 800 may be performed by one or more of the health subsystems and health monitors of the electronic system 102.

At 802, each health monitor is arranged to send first health information of a respective group of components in a first layer of the electronic system to a respective first layer health subsystem of the electronic system which receives the first health information, each group in the first layer being a same circuit type. In an example, each group in the first layer is a circuit type in the form of an integrated circuit. At 804, each of the one or more first layer health subsystems is arranged to send the corresponding first health information to a respective second layer health subsystem of the electronic system. At 806, each of one or more second layer health subsystem is arranged to receive second health information of a respective group in a second layer of the electronic system, the second health information comprises the first health information of each group in the first layer within the group in the second layer and health information from additional components of the group in the second layer, each group in the second layer is a same circuit type and send the corresponding second health information to a third layer health subsystem of the electronic system. In an example, each group of the second layer may be a circuit type in the form of an SoC. At 808, the third layer health subsystem is arranged to receive third health information of a respective group in a third layer of the electronic system, the third health information comprises the second health information of each group in the second layer within the group in the third layer, each group in the third layer is a same circuit type. In an example, each group of the third layer may be a circuit type in the form of a circuit board of the electronic system 102. At 810, the third layer health subsystem is arranged to determine a health condition of the electronic system based on the third health information and a health policy for the electronic system and send the health condition to a display of the electronic system. In an example, a health policy may indicate the health condition based on the health information. At 812, a fourth layer health subsystem of a cloud compute is arranged to receive fourth health information of a respective group in a fourth layer of the electronic system, the fourth health information comprises the third health information and health information from additional electronic systems of a same type as the electronic system, the group in fourth layer includes the electronic system or an additional electronic system; and update the health policy based on the fourth health information. For example, the fourth health information may be used to train a model which receives health information and outputs a health condition of an electronic system. At 814, based on the received health information and the updated health policy, the fourth layer health subsystem provides an indication of the health condition of the electronic system to a wireless terminal.

In an embodiment, a method for layered management of health of an electronic system is disclosed. The method comprises: sending, by each health monitor, first health information of a respective group of components in a first layer of the electronic system to a respective first layer health subsystem of the electronic system which receives the first health information, each group in the first layer being a same circuit type; sending, by each of the one or more first layer health subsystems, the corresponding first health information to a respective second layer health subsystem of the electronic system; receiving, by each of one or more second layer health subsystem, second health information of a respective group in a second layer of the electronic system, the second health information comprises the first health information of each group in the first layer within the group in the second layer and health information from additional components of the group in the second layer, each group in the second layer is a same circuit type; sending, by each of the one or more second layer health subsystems, the corresponding second health information to a third layer health subsystem of the electronic system; receiving, by the third layer health subsystem, third health information of a respective group in a third layer of the electronic system, the third health information comprises the second health information of each group in the second layer within the group in the third layer, each group in the third layer is a same circuit type; determining, by the third layer health subsystem, a health condition of the electronic system based on the third health information and a health policy for the electronic system; and sending, by the third layer health subsystem, the health condition to a display of the electronic system; receiving, by a fourth layer health subsystem on a cloud compute, fourth health information of a respective group in a fourth layer of the electronic system, the fourth health information comprises the third health information and health information from additional electronic systems of a same type as the electronic system, the group in the fourth layer includes the electronic system or one of the additional electronic systems; and updating, by the fourth layer health subsystem, the health policy based on the fourth health information. In an example, determining, by the third layer health subsystem, the health condition of the electronic system comprises determining the health condition based on predictive data analytics and the third health information from the electronic system. In an example, the method further comprises broadcasting, by the fourth layer health subsystem, the health policy to the third layer health subsystem. In an example, the method further comprises broadcasting, by the third layer health subsystem, the health policy to the one or more second layer health subsystems to indicate a timing of receipt of certain health information by a particular health subsystem and a type of the certain health information. In an example, the method further comprises storing, by the third layer health subsystem, the third health information in a non-volatile memory of the electronic system. In an example, the method further comprises receiving, by the second layer health subsystem, an operational request determined based on the health condition from the third layer health subsystem; and providing the operational request to one of the first or second layer health subsystems to execute the operational request. In an example, the operational request is to one or more of power off a component of the electronic system, reset of the electronic system, perform a clock gating, and change a mode of the electronic system. In an example, the method further comprises the fourth layer health subsystem determining the health policy based on predictive data analytics.

In another embodiment, a system for layered management of health of an electronic system is disclosed. The system comprises: each health monitor arranged to send first health information of a respective group of components in a first layer of the electronic system to a respective first layer health subsystem of the electronic system which receives the first health information, each group in the first layer being a same circuit type; each of the one or more first layer health subsystems arranged to send the corresponding first health information to a respective second layer health subsystem of the electronic system; each of one or more second layer health subsystem arranged to receive second health information of a respective group in a second layer of the electronic system, the second health information comprises the first health information of each group in the first layer within the group in the second layer and health information from additional components of the group in the second layer, each group in the second layer is a same circuit type; and send the corresponding second health information to a third layer health subsystem of the electronic system; the third layer health subsystem arranged to receive third health information of a respective group in a third layer of the electronic system, the third health information comprises the second health information of each group in the second layer within the group in the third layer, each group in the third layer is a same circuit type; determine a health condition of the electronic system based on the third health information and a health policy for the electronic system; and send the health condition to a display of the electronic system; and a fourth layer health subsystem on a cloud compute arranged to receive fourth health information of a respective group in a fourth layer of the electronic system, the fourth health information comprises the third health information and health information from additional electronic systems of a same type as the electronic system, the group in the fourth layer includes the electronic system or one of the additional electronic systems; and update the health policy based on the fourth health information. In an example, the third layer health subsystem arranged to determine the health condition comprises determining the health condition based on predictive data analytics and the third health information from the electronic system. In an example, the system further comprises the third layer health subsystem arranged to receive the health policy from the fourth layer health subsystem. In an example, the system further comprises the third layer health subsystem arranged to broadcast the health policy to the one or more second layer health subsystems. In an example, the system further comprises the third layer health subsystem arranged to store the second health information in a non-volatile memory of the electronic system. In an example, the system further comprises the fourth layer health subsystem is arranged to determine the health policy based on predictive data analytics. In an example, the system further comprises the second layer health subsystem arranged to receive an operational request determined based on the health condition from the third layer health subsystem; and provide the operational request to one of the first or second layer health subsystem to execute the operational request. In an example, the operational request is to one or more of power off a component of the electronic system, reset the electronic system, perform a clock gating, and change a mode of the electronic system. In an example, each group in the first layer is an integrated circuit (IC) circuit type, each group in the second layer is a system-on-a-chip (SoC) circuit type, and each group in the third layer is a circuit board circuit type. In an example, the second layer health subsystem arranged to send the second health information to the third layer health subsystem of the electronic system comprises the second layer health subsystem arranged to send a frame comprising a header with an address which uniquely identifies the second layer health subsystem and a payload which includes the second health information. In an example, the second health information further includes a timestamp indicative of when the second health information was received by a health monitor. In an example, the second layer health subsystem and the third layer health subsystem are implemented as a same layer health subsystem.

A layered architecture for managing health of the electronic system comprises a plurality of health subsystems. Health subsystems receive health information from health monitors coupled to respective components of the electronic system and provide the health information to another health subsystem. Based on the received health information, the other health subsystem uses predictive data analytics to determine a health condition of the electronic system and update a health policy based on the predictive data analytics to improve prediction of the health condition of the electronic system.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

The invention claimed is:

1. A method for layered management of health of an electronic system, the method comprising:

sending, by each health monitor, respective first health information of a respective group of components in a first layer of the electronic system in an addressed frame to a respective first layer health subsystem of the electronic system which receives the first health information, each group in the first layer being a same circuit type and the first health information for the respective group in the first layer comprising health information of an integrated circuit of the first layer, the health information of the integrated circuit of the first layer indicated by a first health monitor which only monitors the integrated circuit of the first layer;

sending, by each of the one or more first layer health subsystems, the corresponding first health information in an addressed frame to a respective second layer health subsystem of the electronic system;

receiving, by each of one or more second layer health subsystem, second health information of a respective group in a second layer of the electronic system, the second health information comprises the first health information of each group in the first layer within the group in the second layer and health information from additional components of the respective group in the second layer, each group in the second layer is a same circuit type, the health information of the respective group in the second layer comprising health information of a system on a chip (SoC) of the second layer, the health information of the system on a chip (SoC) indicated by a second health monitor which only monitors the system on a chip (SoC) of the second layer, the SoC comprising one or more integrated circuits of the first layer;

sending, by each of the one or more second layer health subsystems, the corresponding second health information in an addressed frame to a third layer health subsystem of the electronic system;

receiving, by the third layer health subsystem, third health information of a respective group in a third layer of the electronic system, the third health information comprises the second health information of each group in the second layer within the group in the third layer and health information from additional components of the group in the third layer, each group in the third layer is a same circuit type, the health information of the respective group in the third layer of the electronic system comprising health information of a circuit board of the third layer, the health information of the circuit board indicated by a third health monitor which monitors only the circuit board of the third layer, the circuit board comprising one or more integrated circuits of the first layer and one or more SoC of the second layer;

determining, by the third layer health subsystem, a health condition of the electronic system based on the third health information, wherein the third layer health subsystem and not subsystems of the first layer and second layer determines the health condition and indicates that the electronic system is not operating nominally; and sending, by the third layer health subsystem, the health condition to a display of the electronic system;

receiving, by a fourth layer health subsystem on a cloud compute, fourth health information of a respective group in a fourth layer of the electronic system, the fourth health information comprises the third health information and health information from additional electronic systems of a same type as the electronic system, the group in the fourth layer includes the electronic system or one of the additional electronic systems; and updating, by the fourth layer health subsystem, a health policy based on the fourth health information, a corresponding portion of the updated health policy being provided to each of the first layer health subsystems, the second layer health subsystems, and the third layer health subsystems in an addressed frame;

wherein the health condition of the electronic system indicates whether a component in a layer of the electronic system is failing; and performing a predictive maintenance of the electronic system based on the health condition and before the component in the layer fails to ensure reliable operation the electronic system; and wherein the health information at each layer is collected from respective one or more health monitors of the layer, each of the health monitors comprising circuitry configured for indicating respective health information of the respective component; and wherein one or more of the health subsystems comprises circuitry for sending respective health information to another health subsystem, each health subsystem comprising circuitry for receiving respective health information; and wherein the third layer health subsystem comprise circuitry for determining the health condition and the health policy based on received health information;

and, responsive to determining the health condition, causing the second layer health subsystem to execute an operational request comprising at least one of gating a clock, changing an operational mode, resetting the electronic system, or powering off a component of the SoC of the second layer based on the health policy.

2. The method of claim 1, wherein determining, by the third layer health subsystem, the health condition of the electronic system comprises determining the health condition based on predictive data analytics and the third health information from the electronic system.

3. The method of claim 1, further comprising broadcasting, by the fourth layer health subsystem, the health policy to the third layer health subsystem via a wireless connection.

4. The method of claim 3, further comprising broadcasting, by the third layer health subsystem, the health policy to the one or more second layer health subsystems to indicate a timing of receipt of certain health information by a particular health subsystem and a type of the certain health information.

5. The method of claim 1, further comprising storing, by the third layer health subsystem, the third health information in a non-volatile memory of the electronic system.

6. The method of claim 1, further comprising receiving, by the second layer health subsystem, an operational request determined based on the health condition from the third layer health subsystem; and providing the operational request to one of the first or second layer health subsystems to execute the operational request.

7. The method of claim 6, wherein the operational request is to one or more of power off a component of the electronic system, reset of the electronic system, perform a clock gating, and change a mode of the electronic system.

8. The method of claim 1, further comprising the fourth layer health subsystem determining the health policy based on predictive data analytics.

9. A system for layered management of health of an electronic system, the system comprising:

each health monitor arranged to send respective first health information of a respective group of components in a first layer of the electronic system to a respective first layer health subsystem of the electronic system which receives the first health information, each group in the first layer being a same circuit type and first health information for the respective group of components in the first layer comprising health information of an integrated circuit of the first layer, the health information of the integrated circuit indicated by a first health monitor which monitors only the integrated circuit of the first layer;

each of the one or more first layer health subsystems arranged to send the corresponding first health information to a respective second layer health subsystem of the electronic system;

each of one or more second layer health subsystem arranged to receive second health information of a respective group in a second layer of the electronic system, the second health information comprises the first health information of each group in the first layer within the group in the second layer and health information from additional components of the respective group in the second layer, each group in the second layer is a same circuit type, health information of the respective group comprising health information of an SoC of the second layer, the health information of the SoC indicated by a second health monitor which monitors only the SoC in the second layer, the SoC comprising one or more integrated circuits of the first layer; and send the corresponding second health information to a third layer health subsystem of the electronic system;

the third layer health subsystem arranged to receive third health information of a respective group in a third layer of the electronic system, the third health information comprises the second health information of each group in the second layer within the group in the third layer and health information from additional components of the group in the third layer, each group in the third layer is a same circuit type; the health information of the respective group in the third layer of the electronic system comprising health information of a circuit board of the third layer, the health information of the circuit board indicated by a third health monitor which monitors only the circuit board in the third layer, the circuit board comprising one or more integrated circuits of the first layer and one or more SoC of the second layer; determine a health condition of the electronic system based on the third health information, wherein the third layer health subsystem and not subsystems of the first layer and second layer determines the health condition and indicates that the electronic system is not operating nominally; and send the health condition to a display of the electronic system; and a fourth layer health subsystem on a cloud compute arranged to receive fourth health information of a respective group in a fourth layer of the electronic system, the fourth health information comprises the third health information and health information from additional electronic systems of a same type as the electronic system, the group in the fourth layer includes the electronic system or one of the additional electronic systems; and update a health policy based on the fourth health information, a corresponding portion of the updated health policy being provided to each of the first layer health subsystems, the second layer health subsystems, and the third layer health subsystems in an addressed frame;

wherein the health condition of the electronic system indicates whether a component in a layer of the electronic system is failing;

wherein the fourth layer health subsystem is further arranged to perform a predictive maintenance of the electronic based on the health condition before the component in the layer fails to ensure reliable operation the electronic system; and wherein the health information at each layer is collected from respective one or more health monitors of the layer; wherein each of the health monitors comprising circuitry configured for indicating respective health information of the respective component; and wherein one or more of the health subsystems comprises circuitry for sending respective health information to another health subsystem, each health subsystem comprising circuitry for receiving respective health information; and wherein the third layer health subsystem comprise circuitry for determining the health condition and the health policy based on received health information and, responsive to determining the health condition, causing the second layer health subsystem to execute an operational request comprising at least one of gating a clock, changing an operational mode, resetting the electronic system, or powering off a component of the SoC of the second layer based on the health policy.

10. The system of claim 9, wherein the third layer health subsystem arranged to determine the health condition comprises determining the health condition based on predictive data analytics and the third health information from the electronic system.

11. The system of claim 10, further comprising the third layer health subsystem arranged to receive the health policy from the fourth layer health subsystem via a wireless connection.

12. The system of claim 9, further comprising the third layer health subsystem arranged to broadcast the health policy to the one or more second layer health subsystems.

13. The system of claim 9 further comprising the third layer health subsystem arranged to store the second health information in a non-volatile memory of the electronic system.

14. The system of claim 9, further comprising the fourth layer health subsystem is arranged to determine the health policy based on predictive data analytics.

15. The system of claim 9, further comprising the second layer health subsystem arranged to receive an operational request determined based on the health condition from the third layer health subsystem; and provide the operational request to one of the first or second layer health subsystem to execute the operational request.

16. The system of claim 15, wherein the operational request is to one or more of power off a component of the electronic system, reset the electronic system, perform a clock gating, and change a mode of the electronic system.

17. The system of claim 9, wherein each group in the first layer is an integrated circuit (IC) circuit type, each group in the second layer is a system-on-a-chip (SoC) circuit type, and each group in the third layer is a circuit board circuit type.

18. The system of claim 9, wherein the second layer health subsystem arranged to send the second health information to the third layer health subsystem of the electronic system comprises the second layer health subsystem arranged to send a frame comprising a header with an address which uniquely identifies the second layer health subsystem and a payload which includes the second health information.

19. The system of claim 18, wherein the second health information further includes a timestamp indicative of when the second health information was received by a health monitor.

20. The system of claim 9, wherein the second layer health subsystem and the third layer health subsystem are implemented as a same layer health subsystem.

* * * * *